Inventors
F. H. BRAY - J. M. RIDLER
By [signature]
Attorney

*Inventor*
F. H. BRAY - J. M. RIDLER
By Paul W. Hemminger
*Attorney*

June 30, 1964 F. H. BRAY ET AL 3,139,486

AUTOMATIC EXCHANGE SYSTEMS

Filed July 27, 1961 4 Sheets-Sheet 3

*Inventor*
F. H. BRAY - J. M. RIDLER

By Paul W. Hemminger
*Attorney*

*Inventor*
F. H. BRAY - J. M. RIDLER
By Paul W. Hemminger
*Attorney*

United States Patent Office 3,139,486

Patented June 30, 1964

3,139,486

AUTOMATIC EXCHANGE SYSTEMS

Frederick Harry Bray and John Malcolm Ridler, both of London, England, assignors to International Standard Electric Corporation, New York, N.Y., a corporation of Delaware Filed July 27, 1961, Ser. No. 127,222
Claims priority, application Great Britain Aug. 2, 1960
7 Claims. (Cl. 179—8)

This invention relates to equipment associated with subscribers' line circuits in an automatic telecommunication exchange system, and in particular to equipment for ascertaining the class of service appertaining to a subscriber and for storing the total value of meter charges for originated calls.

The various classes of service may include coin box service, barred trunk service, and other types, and in general this information for each individual subscriber will be required for the correct treatment of each call. This information is required as soon as the call commences, and it is convenient that the request for it should be made by and answered to the register, such as is provided in the usual automatic exchange. This may be done by passing back a signal from the register to the line circuit and thus via a special lead to a common circuit-denoting the class of service, from which an answering signal is returned to the register indicating the class of service for this line. In systems with high-speed switching control when it is an advantage to have only one register functioning at a time, the return of the answering signal to the register may be done over common circuits with resultant economy. The embodiment to be described is of this type.

The storage of meter charges is required to be in such a form that the information may easily be transmitted to a central point for automatic accounting methods, and the detection of meter pulses should take place via the subscriber's line circuit in order to associate it with the equipment number of the line.

By the method disclosed in this invention, it is possible to provide this requirement via the same wire from the subscriber's line circuit as is used for class-of-service indication.

According to the invention therefore there is provided in an automatic telecommunication exchange system, a first electrical means for storing a meter reading for each of a plurality of subscribers, and a second electrical means for indicating the class of service for each of the same plurality of subscribers, and in which for any of the subscribers both said electrical means are controlled without mutual interference by a plurality of electrical pulses acting in a wire from the subscriber's line circuit which is common to both said first and said second electrical means.

An embodiment of the invention will now be described with reference to the accompanying drawings, in which.

The embodiment uses magnetic matrices constructed in known manner by arranging small ring-shaped cores of ferrite material in a rectangular matrix and threading the cores by current-carrying wires by which the magnetisation of the cores may be produced or detected. Each core has a substantially rectangular hysteresis loop, so that a definite minimum value of magnetising force is required to reverse the magnetisation in either direction, and the core will remain in one of two oppositely polarised remanent states when the magnetising current is cut off.

Figure 1:
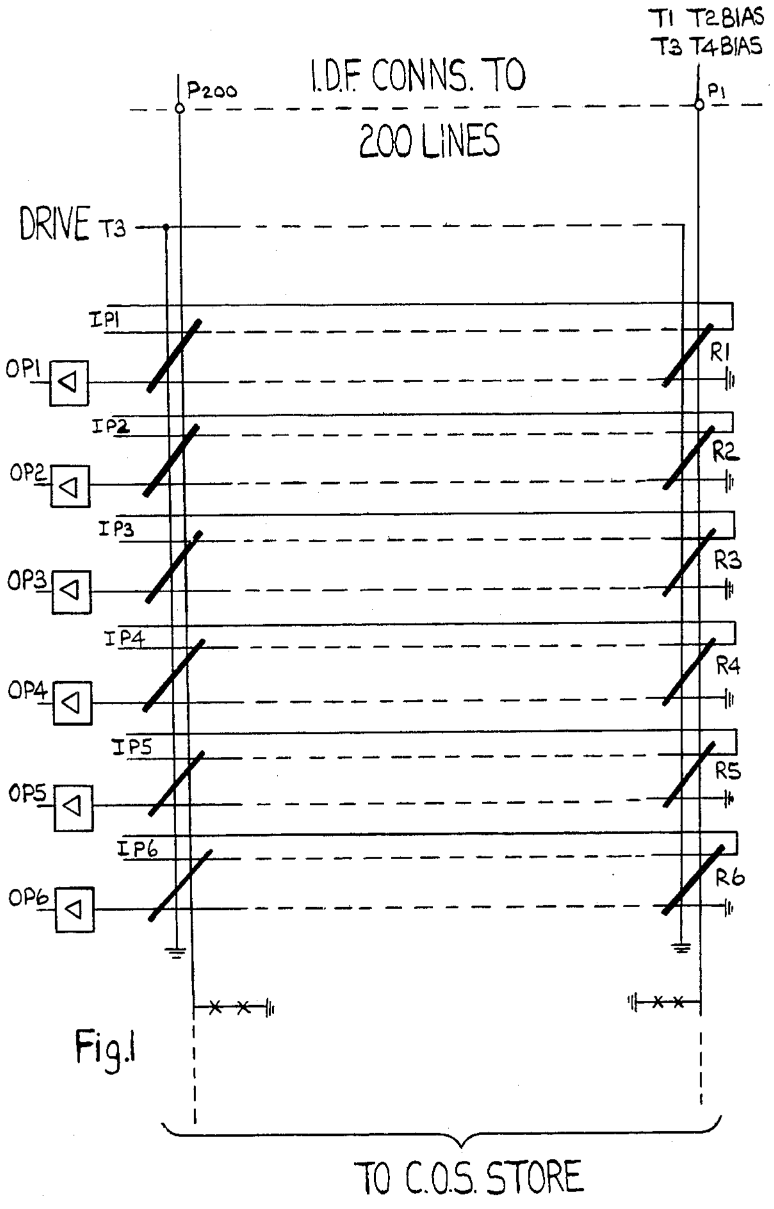
FIG. 1 shows a magnetic (ferrite) store for storing the values of meter charges for 200 subscribers' lines.

In FIG. 1 the meter store, which stores the value of metering charges, has 200 colums of cores, each column storing the meter reading for one subscriber and having six cores, which are enabled by the associated circuitry to store in binary notation a total of $2^6-1=63$ as meter reading for each subscriber. It will be appreciated that larger values could be stored and processed according to the invention, merely by increasing the number of cores per column and the size of the binary adding circuit in FIG. 3, the maximum value stored being approximately doubled by adding one core.

Figure 2:
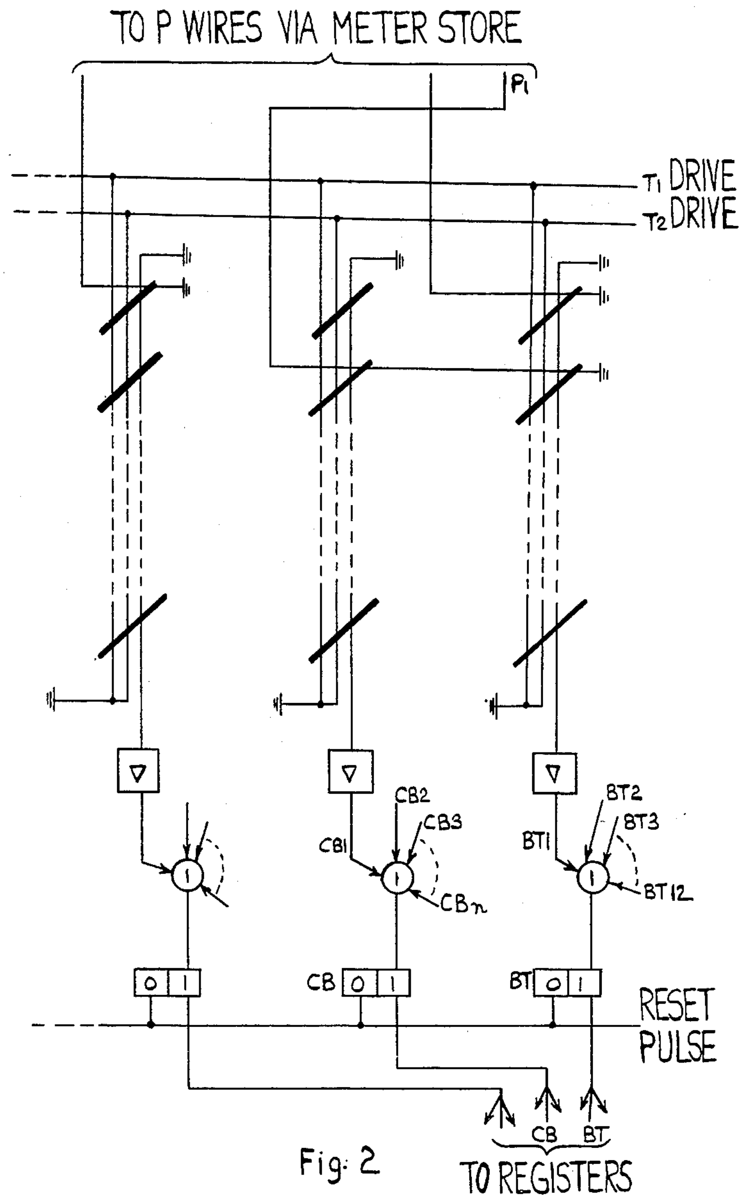
FIG. 2 shows a magnetic (ferrite) store for giving class-of-service indications for 200 subscribers' lines.

In FIG. 2 the class-of-service (C.O.S.) indicator has one column, or a group of columns if required, for each different class of service, and each subscribers line in the same group of 200 is associated with one core in the column, or in one of the columns of a group, corresponding to its class-of-service. Thus a subscriber may be associated with one or more C.O.S. or with none at all.

A group of 200 lines is a convenient size, but it may be possible to use larger groups, say 1000 lines, if the suppression of "noise" as mentioned later in this specification is adequate.

In FIGS. 1 and 2 the cores are represented as thick diagonal lines (simulating an edge-wise view); and each core has four wires threaded through it. The cores are controlled by a system of electrical pulses, shown in FIG. 4, and the "half-write" principle is used, in which two simultaneous pulses on two wires are required to switch a core from one state to the other, one pulse by itself being able to produce only a negligibly small permanent change of flux.

Referring first to the meter store, FIG. 1, a wire P1–P200 from each of the 200 subscribers' line circuits threads the six cores in the corresponding column, terminating in earth directly if there is no C.O.S. to be considered, or terminating in earth after passing through cores in FIG. 2 if the line has a particular C.O.S. This lead carries for metering purposes bias pulses $T_3$ and $T_4$ (FIG. 4). A second "vertical" wire carries $T_3$ Drive pulses, which are in phase with the $T_3$ Bias pulses but of shorter duration, and are connected permanently to all the 1200 cores in the matrix. The earthed "horizontal" wire is the output, OP1–6, each wire being threaded through all the cores in all the 200 columns which refer to the same binary digit of the number stored in any column, and going to FIG. 3. A second "horizontal" wire, also threaded through all cores with the same binary digit, will carry $T_4$ Drive pulses which are returned from FIG. 3, and are in phase with $T_4$ Bias pulses but of shorter duration. Referring now to the C.O.S. store, FIG. 2, each wire from a line circuit having a C.O.S., after passing through the meter storage column in FIG. 1, is threaded through a core in the column corresponding to the C.O.S. required, there being one core per subscriber per C.O.S. This wire will carry Bias pulses $T_1$ and $T_2$ (FIG. 4), in addition to the $T_3$ and $T_4$ meter pulses previously mentioned. The other two wires carry Drive pulses $T_1$ and $T_2$ respectively, which are permanently connected to all C.O.S. cores and are in phase with the Bias pulses but of shorter duration.

Descriptions will now be given, firstly of the class-of-service operation since it occurs at the beginning of a call, and secondly of the metering operation which occurs when the call matures.

*Class-of-service.*—When a free register has been seized due to a call from the subscriber's line associated with, say, the lead $P_1$ on FIG. 1, a signal is returned from the register which consists of a $T_1$ Bias pulse followed by a $T_2$ Bias pulse, and appears on the lead $P_1$. The $T_1$ pulse biasses all the meter cores in the column and also the two C.O.S. cores in FIG. 2 through which lead $P_1$ passes, since this subscriber is supposed to be a coin base (C.B.) with a barred trunks restriction (B.T.) At the same time a $T_1$ Drive pulse appears in all the C.O.S. cores, so that coincidence of $T_1$ Bias and Drive pulses in the two C.O.S. cores on lead $P_1$ switches them and causes an output pulse to appear on each of leads CB1 and BT1.

These output pulses, amplified as shown on FIG. 2, switch the toggles BT and CB to the "1" state, acting through an OR gate which is provided to accommodate other columns of cores associated with the same C.O.S. facilities. On the arrival of the $T_2$ Bias pulse, the biassing effect of $T_1$ is cancelled in all the meter cores, and with the simultaneous $T_2$ Drive pulse in all the C.O.S. cores the two previously switched cores are switched back to the "0" state.

The interval between $T_1$ and $T_2$ has only to be long enough to get the toggles fully switched. The outputs from the toggles are multiplied over each C.O.S. facility as shown and connected to all registers. Since in this embodiment only one register functions at a time, this C.O.S. signal will be received by the register which initiated the signal over the $P_1$ lead and will enable the register to control the call subsequently according to the C.O.S. so indicated.

When the register has received the signal it disconnects the pulses to the $P_1$ lead, and the C.O.S. Reset pulse (FIG. 4) then returns all C.O.S. toggles to the normal state, whereupon the store is available for another call. It will be realised that only one C.O.S. operation at a time may be handled in one group of 200 lines. In this embodiment this proviso is fulfilled since only one register functions at a time, but in systems where several registers may function simultaneously an embodiment according to the invention could be provided by suitable safeguards to avoid the pulsing of more than one P lead at a time and to choose the correct register to receive the C.O.S. indication signal.

*Metering.*—When the call has matured a series of Bias pulses, $T_3$ and $T_4$ alternately, is received on, say, the $P_1$ lead, the number of pulses signifying the charge for the call. The cores in the corresponding column of the meter store, FIG. 1, are in the "0" or "1" state, signifying in binary notation the current meter total (the top core in the figure holding the least significant digit). Suppose this total to be 27, which is 011011 in binary notation, so that cores $R_1$, $R_2$, $R_4$ and $R_5$ are in state "1" and the remainder in state "0."

The first T3 Bias pulse biasses all cores in the column, so that in conjunction with $T_3$ Drive pulse the cores R1, R2, R4, R5 are driven to the "0" state, the remainder remaining in this state. Output pulses are therefore produced in OP leads 1, 2, 4 and 5.

Figure 3:
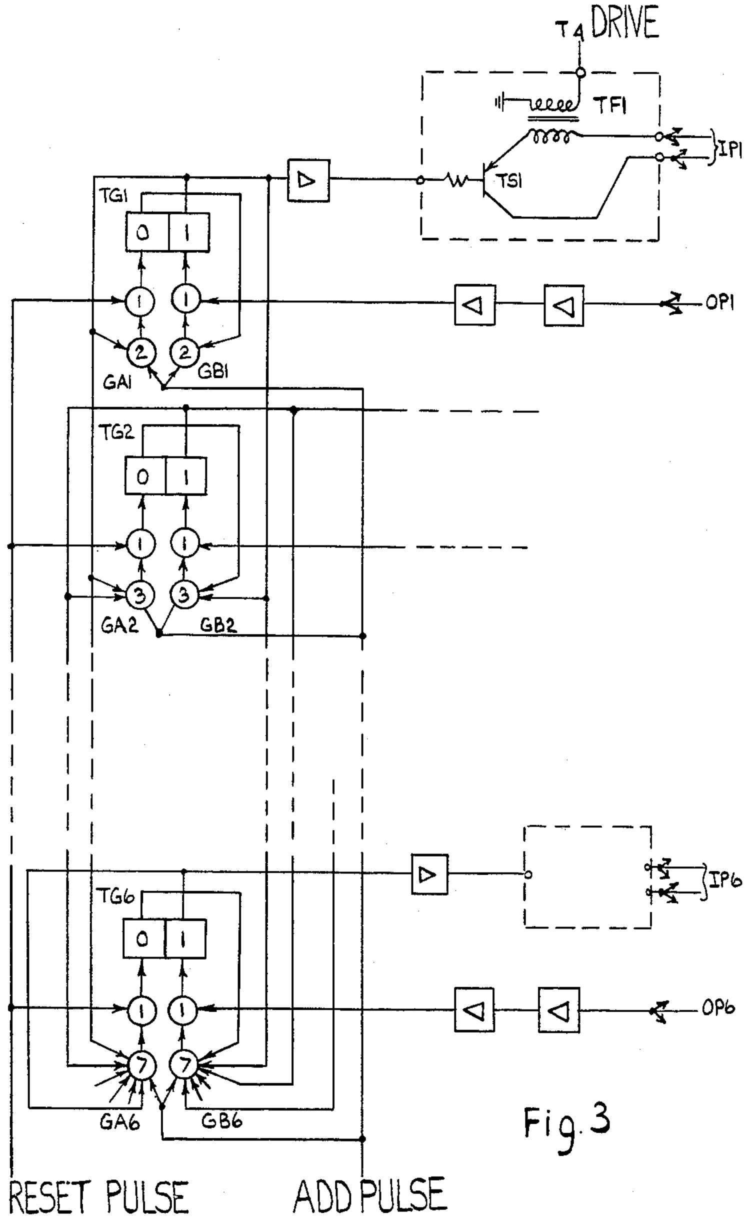
FIG. 3 shows adding equipment for use with the meter stores for 5 groups of 200 subscribers' lines.
Figure 4:
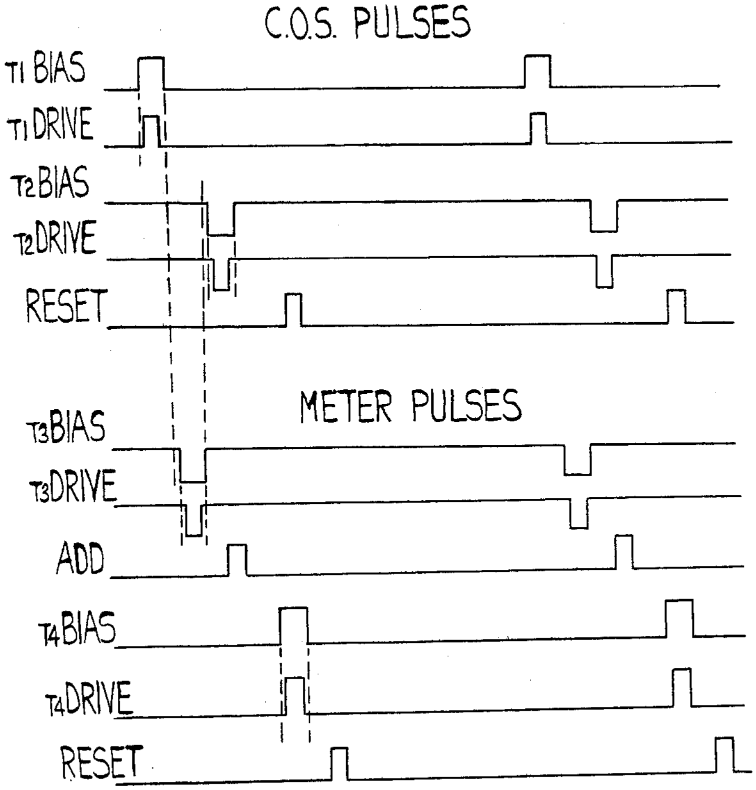
FIG. 4 shows pulses used for operating the magnetic stores and associated toggles.

In FIG. 3 is shown (functionally) a set of six toggles TG1–6, TG3, 4, 5 being not shown but similar to TG2. The OP leads from the meter store are connected through OR gates to the "1" sides of the toggles, and a Reset pulse (FIG. 4) to the "0" sides through other OR gates. OP2, 3, 4, are not shown but are similar to OP1 and 6.

The set of toggles, though not a binary counter, is capable of storing a number in binary notation of up to six digits, TG1 having the least significant digit. An ADD-pulse (FIG. 4) is connected through gates such as GA1, GB1, to both sides of the toggles, and the toggles and gates are interconnected in such a manner that an Add-pulse will reverse the state of all toggles up to and including the toggle with the first "0" digit, starting from TG1, whereby the number stored is increased by 1. The equipment in FIG. 3 is per 1000 subscribers' lines, i.e., common to five groups of 200 lines as indicated by the commoning symbols on the leads.

In the example chosen, the outputs of leads OP1, 2, 4, 5 from the meter store, after being buffered and amplified as shown, switch toggles TG1, 2, 4, 5 to the "1" state. On the arrival of an Add pulse, toggles TG1 and 2 are switched to the "0" state via gates GA1 and GA2, and TG3 to the "1" state via gate GB3, in accordance with the interconnections mentioned above. Thus the toggles now hold the number 011100 in binary, =28 in decimal.

The "1" outputs of the toggles are connected via the amplifiers and transistor gating circuits shown in FIG. 3 to the six pairs of leads IP1–6 which connect to the cores in the meter store FIG. 1. Circuits are shown for leads IP1 and 6, the others being similar. The presence of a "1" output on a toggle, say TG1, will apply a potential, after amplification as indicated, to the base of the gating transistor TS1 shown in the dotted rectangle. This has no effect for the toggle outputs produced by the number transfer from the meter store, since the transistor circuit then has no collector potential. But at the time when the outputs produced by an Add pulse occur, a $T_4$ Drive pulse acting through the transformers, such as TF1, of all the six transistor gating circuits produces operating potential pulses for all the transistors. The gating circuit whose transistor has a base potential from the toggle, i.e., TG1, will therefore at the time of $T_4$ Drive pulse gate a pulse through to the corresponding row of cores in the meter store, FIG. 1.

Thus in the example chosen, toggle outputs appear from TG3, 4, 5 and pulses are gated through to rows R3, R4, R5 in FIG. 1. At the same time the $T_4$ Bias pulse appears on the lead P1, so that cores $R_3$, $R_4$, $R_5$ in the first column are switched by the two pulses in coincidence. A Reset pulse (FIG. 4) now restores all the toggles in FIG. 3 to the "0" state. The meter store now holds the figure 28 as the meter total in the first column. When the next meter pulse, i.e., $T_3$ and $T_4$, arrives the operation is repeated to a new total of 29. Once the new meter total has been received from the adder and stored in the core matrix, the equipment is available for storing a meter pulse for another cell. It is of course necessary to arrange, generally in the circuit controlling the application of metering, that only one meter pulse arrives at a time in one 1000 line group. This means that the complete operation cycle of 4 pulses must be short enough to meter the expected proportion of this 1000 lines in the interval allowed by the fastest metering rate used in the exchange system. The intervals between the four pulses must also be long enough to get the toggles and cores fully switched.

It will be appreciated that the C.O.S. and metering functions are able to take place over the same P wire without interference, provided that pulses $T_1$ and $T_2$ do not occur at the same time as $T_3$ and $T_4$ respectively. This means that the repetition rates of the two pulse systems could be quite different if desired, provided that one was a simple multiple of the other.

The Bias pulses will generally have relatively slow rise and decay times, since they originate in the exchange switching circuit. They are therefore made somewhat longer than the corresponding Drive pulses, which may be more nearly rectangular, since they are produced "locally," and are timed to be coincident with the middle of the Bias pulses. In practice, $T_2$ and $T_4$, which only reset the cores and are not concerned with producing an output pulse, could with advantage have slow rise and decay times.

It should be noted of course that the amplitudes and the relative width and timing of the pulses as shown in FIG. 4 are typical only and are not intended to give actual values.

Known arrangements may be used to safeguard the operations against undue "noise," which may arise from the action of half-write pulses on the cores since the hysteresis loop in practice is not truly rectangular. One measure is to pass the output wires through the cores in opposite directions in alternate cores, thus substantially cancelling the total noise induced in the wire, and to use an amplifier which will give the required output for an input of either polarity. Another or additional measure is to use a "strobe," i.e. master control, pulse which by means of a gate completes the core output circuit slightly after the beginning of a Drive pulse, so that a noise pulse, which occurs earlier than a true output pulse, is suppressed or much diminished, while a true output pulse goes through.

It is to be understood that the foregoing description of specific examples of this invention is not to be considered as a limitation of its scope.

What we claim is:

1. An automatic telephone system for extending connections between calling and called lines and for recording charge exaction data, therefor, certain of said lines having one of a number of restriction classifications, control means common to said lines for generating signals indicative of said charge exaction data and the said classification of each calling line, first and second magnetic matrix stores associated with the said lines, the first store having a plurality of sections for storing charge exaction data for respective lines, the second store having a plurality of sections for indicating the respective types of classification of the said classified lines, and single wire means associated with each said line and common to both said matrix stores for controlling said matrix stores in accordance with said charge exaction data and said classification signals transmitted over said single wire means.

2. An automatic telephone system as set forth in claim 1, wherein said charge exaction data signals and said classification signals are transmitted from said control means to both of said stores on a time sharing basis.

3. An automatic telephone system as set forth in claim 1, wherein said charge exaction signals transmitted over said single wire means controls the said first matrix stores independently of said second matrix stores and wherein said classification signals transmitted over said single wire means controls the said second matrix stores independently of said first matrix store.

4. An automatic telephone system as set forth in claim 1, wherein said control means comprises a plurality of bistable circuits normally in a first of a first and second binary output states, each of said bistable circuits associated with one of said sections of said second matrix that indicates a particular class of service, means responsive to said signal over said single wire means occurring during a first time period for generating a pulse in the section of said second matrix associated with said calling line, means responsive to said pulse for switching said associated bistable circuit to said second binary output state, means responsive to said second binary output for indicating the service classification of said calling line and for generating a reset signal for resetting said bistable circuit.

5. An automatic telephone system as set forth in claim 1, wherein each section of said first store comprises a column of square hysteresis loop magnetic cores, each magnetic core having a first and a second stable state, means responsive to meter pulses on said single wire during a second time period for switching said cores from said first state to said second state, binary counter means increasing its binary count one unit per pulse responsive to said cores switching and means responsive to said increased count for resetting some of said magnetic cores to said first state.

6. An automatic telephone system as set forth in claim 5, wherein said reset means comprises transistorized "AND" gate means operated responsive to pulses on said single wire occurring during a third time period.

7. An automatic telephone system as set forth in claim 6, and means responsive to recurring reset signals from said common control means for resetting said binary counter means.

References Cited in the file of this patent

UNITED STATES PATENTS

| | | |
|---|---|---|
| 2,381,727 | Deakin | Aug. 7, 1945 |
| 2,678,969 | Lomax | May 18, 1954 |
| 2,904,636 | McKim et al. | Sept. 15, 1959 |
| 2,916,552 | Wolf | Dec. 8, 1959 |
| 2,933,563 | Hohmann | Apr. 19, 1960 |
| 2,952,742 | Kizasu | Sept. 13, 1960 |